United States Patent [19]

Ritter

[11] E Re. 29,311

[45] Reissued July 19, 1977

[54] PAINTING APPARATUS

[76] Inventor: Erwin A. Ritter, 3662 Bendermeer Road, Cleveland Heights, Ohio 44118

[21] Appl. No.: 691,222

[22] Filed: June 1, 1976

Related U.S. Patent Documents

Reissue of:

[64] Patent No.: 3,879,140
Issued: Apr. 22, 1975
Appl. No.: 322,798
Filed: Jan. 11, 1973

[51] Int. Cl.[2] ..... B44D 3/28

[52] U.S. Cl. ..... 401/188 R; 401/133; 401/197; 401/203

[58] Field of Search ..... 401/188, 189, 203–206, 401/270, 271, 289; 15/143 B, 144 A

[56] References Cited

U.S. PATENT DOCUMENTS

| | | | |
|---|---|---|---|
| 797,358 | 8/1905 | Howell | 401/203 |
| 1,406,841 | 2/1922 | Foss | 15/144 B |
| 1,598,742 | 9/1926 | Parker | 401/203 X |
| 2,623,234 | 12/1952 | Brown | 15/143 B X |
| 2,641,012 | 6/1953 | Storrs | 15/144 B |
| 3,549,267 | 12/1970 | Wurzer et al. | 401/197 X |

FOREIGN PATENT DOCUMENTS

| | | | |
|---|---|---|---|
| 1,484,813 | 5/1967 | France | 401/197 |
| 1,334,210 | 7/1963 | France | 401/188 |

*Primary Examiner*—Lawrence Charles

[57] ABSTRACT

An apparatus is used for applying paint in a container to a surface. The apparatus includes a paint applicator which is movable along the surface to apply paint directed thereto to the surface. Conduit means is provided for directing the paint from the container to the applicator means. A pump having an inlet in communication with the paint in the container and which is operable to continuously draw paint from an open-end container has an outlet which communicates with the conduit means the the pump directs the paint through the conduit means to the applicator. Means is provided for continuously directing at least a part of the paint from the outlet of the pump back to the container so that the paint in the container is continuously mixed in the container while paint is being delivered to the applicator. In addition, the applicator is carried on an extensible or telescoping-type handle and the handle is removable from the applicator without disconnecting the conduit for directing the paint to the applicator.

4 Claims, 8 Drawing Figures

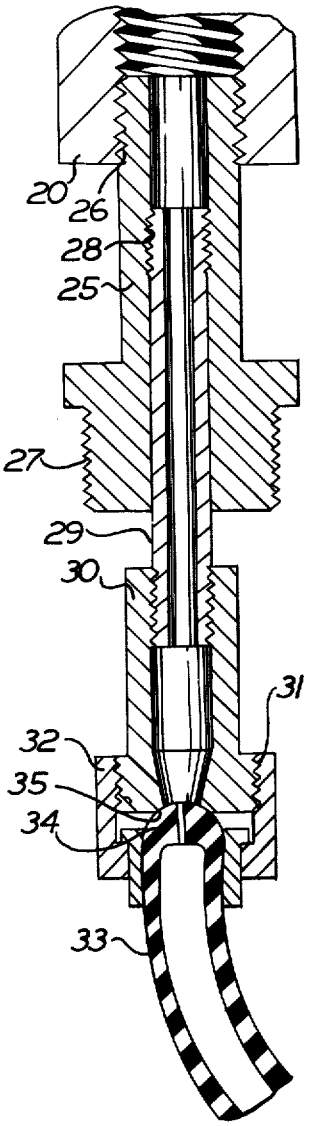
FIG. 3
FIG. 4
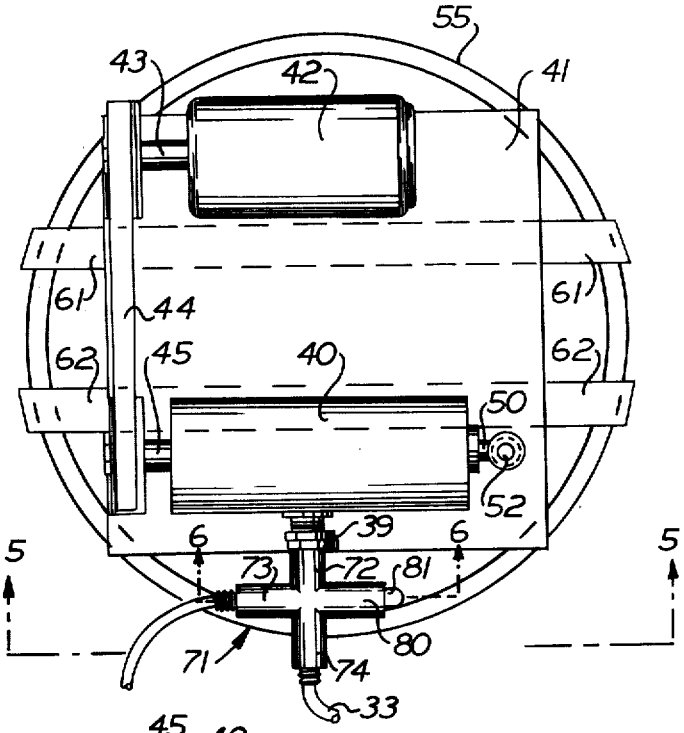
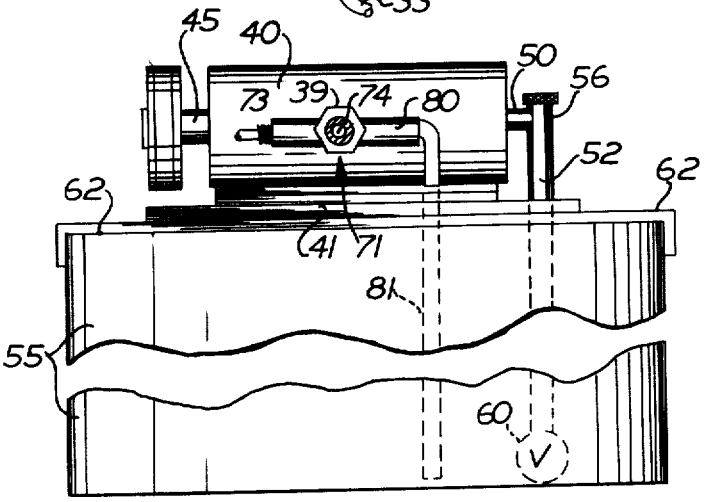
FIG. 5

PAINTING APPARATUS

Matter enclosed in heavy brackets [ ] appears in the original patent but forms no part of this reissue specification; matter printed in italics indicates the additions made by reissue.

BACKGROUND OF THE INVENTION

The present invention is directed to an apparatus and a method for use in applying paint in an open container to a surface, and particularly relates to such an apparatus which includes an applicator to which paint is delivered from the container for application to the surface. Known systems for applying paint in a container to a surface include an applicator such as a roller or brush and a means for forcing or directing paint from a container to the roller so that as the roller is manually moved over the surface, paint is applied by the roller to the surface. Typically, such systems do include a pump which is associated with the container and which forces the paint from the container to the roller. Such known systems may direct the paint either to the exterior of the roller or to the interior of the roller. Certain types of such systems for delivering paint to a roller or for applying paint to a surface include a pump which applies a pressure to the paint can and pressurizes the can in order to force the fluid or paint from the can to the roller. Of course, in operation of such a system with a pressurized can, the possibility of the can bursting under the force or pressure is a distinct one and such systems have that disadvantage.

In addition, not only the known systems which utilize pressure on the container for forcing the paint to the applicator, but also other systems which do not utilize pressure on the container have the disadvantage that after the paint has been applied to the wall, there is a distinct color different across the surface which is painted.

Additionally, known painting apparatuses which utilize a pump for forcing or directing fluid to an applicator also utilize extensible-type handles connected with the applicator so that the applicator may be used in a variety of places for a variety of uses, such as, for example, painting ceilings and high walls as well as painting floors and easily reached wall surfaces. Known extensible handles connected with such applicators have a complication in that the paint flows through the handle and past the telescoping interconnection of different parts of the handle. This necessitates or requires a particularly special sealing structure between the telescoping parts of the handle and if such sealing structure is not provided, leakage can occur, and frequently does occur, in such structures.

SUMMARY OF THE PRESENT INVENTION

The present invention is directed to a paint applicator system which provides a substantial improvement over the prior art. The paint applicator system of the present invention not only is one which does not utilize a high pressure on the paint container, but also is one which is constructed so as to minimize the possibility of a different in color across or between different portions of a surface which is painted by paint from the same container. This advantage is provided or effected due to the fact that paint in the container is continuously mixed while certain of the paint from the container is being applied to the wall surface. In accordance with the present invention, this continuous mixing action occurs due to the fact that the pump outlet is not only connected to the applicator for delivering paint to the applicator, but is also connected to a conduit for directing the paint back into the can. The structure is such that the paint which is directed back into the can causes a continuous mixing or turbulence in the can so that the paint in the can is continuously mixed. As a result, paint which is drawn from the can by the pump is provided with a uniform color and the result is that the uniform color is provided across the surface which is painted.

In addition, the present invention provides a very novel and unique arrangement for enabling the applicator to be utilized in a variety of different locations for painting a variety of different surfaces. The handle is an extensible handle and the system is constructed so as to minimize and eliminate the possibility of any paint leaking between relatively extensible portions of the handle. This construction is effected because the extensible handle is connected directly to the applicator and the conduit for directing paint through the handle is also directly connected to the applicator. The handle is extensible and at the same time is also removable from the applicator. Accordingly, the applicator can be readily used for painting close work as well as for painting ceilings and the like which require substantial reach by the man who is operating the applicator. Moreover, in view of this construction there is no tendency for leakage of the paint between relatively slidable parts of an extensible handle.

DESCRIPTION OF THE FIGURES

Further objects and advantages of the present invention will be apparent to those skilled in the art to which it relates from the following detailed description of a preferred embodiment thereof made with reference to the accompanying drawings and in which:

FIG. 3 is an enlarged sectional view of a connector portion of the system of FIG. 1;

FIG. 4 is a top view of the system of FIG. 1;

FIG. 5 is a side sectional view of the portion of the system shown in FIG. 4;

DESCRIPTION OF THE PREFERRED EMBODIMENT

As noted hereinabove, the present invention relates to an improved apparatus and method for applying paint in a container to a surface. The drawings illustrate a representative embodiment of the present invention and certain modifications and changes may be made therein as will be apparent from the description hereinbelow. The representative embodiment of the present invention is shown in FIG. 1.

Figure 1:
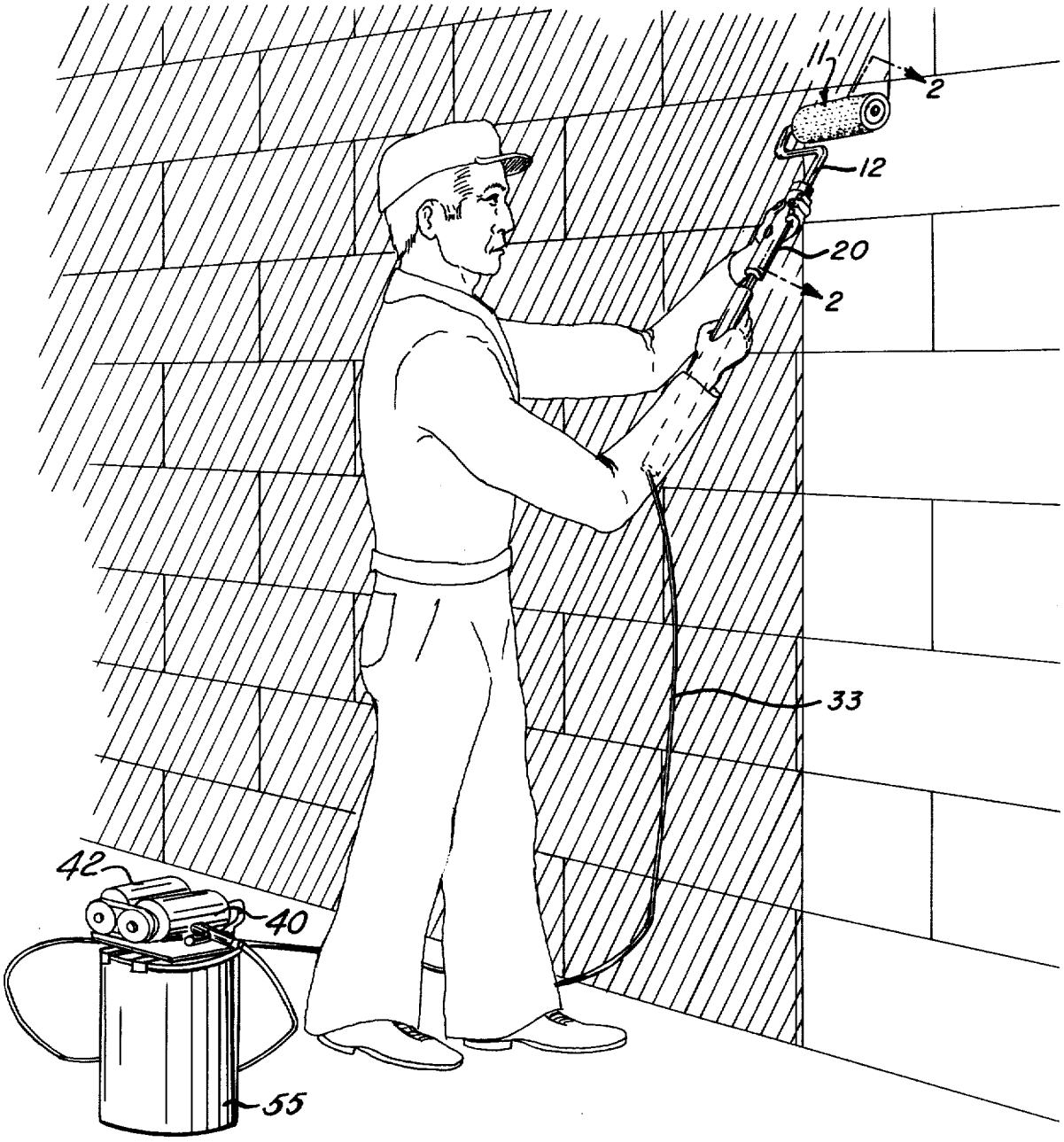
FIG. 1 is a pictorial representation of a paint applicator system embodying the present invention.

As shown in FIG. 1, the present invention is applied to a paint roller apparatus and includes a paint roller 11 which is rotatably carried on a handle 12. The handle 12 when manually moved by a painter results in the roller 11 rolling along the suface to be painted and any paint which is applied on the roller 11 will be applied to the surface to be painted.

The roller 11 may be of any conventional construction and the paint may be delivered thereto either exteriorly thereof or interiorly thereof. As shown in the present embodiment the paint is delivered interiorly of the roller 11. In this connection the roller 11 includes an outer surface of suitable material 13 which rolls in contact with the surface to be painted. The material 13 is carried on a cylindrical heavy cardboard member 14. The member 14 has a plurality of radial openings 14a therethrough through which paint may flow to the material 13. The roller 13 is of conventional construction and is rotatably supported by plastic retainers 15 and 16 which close the ends of the tubular member 14 and are located on an axially extending portion 17 of the handle 12.

Figures 2, 8:
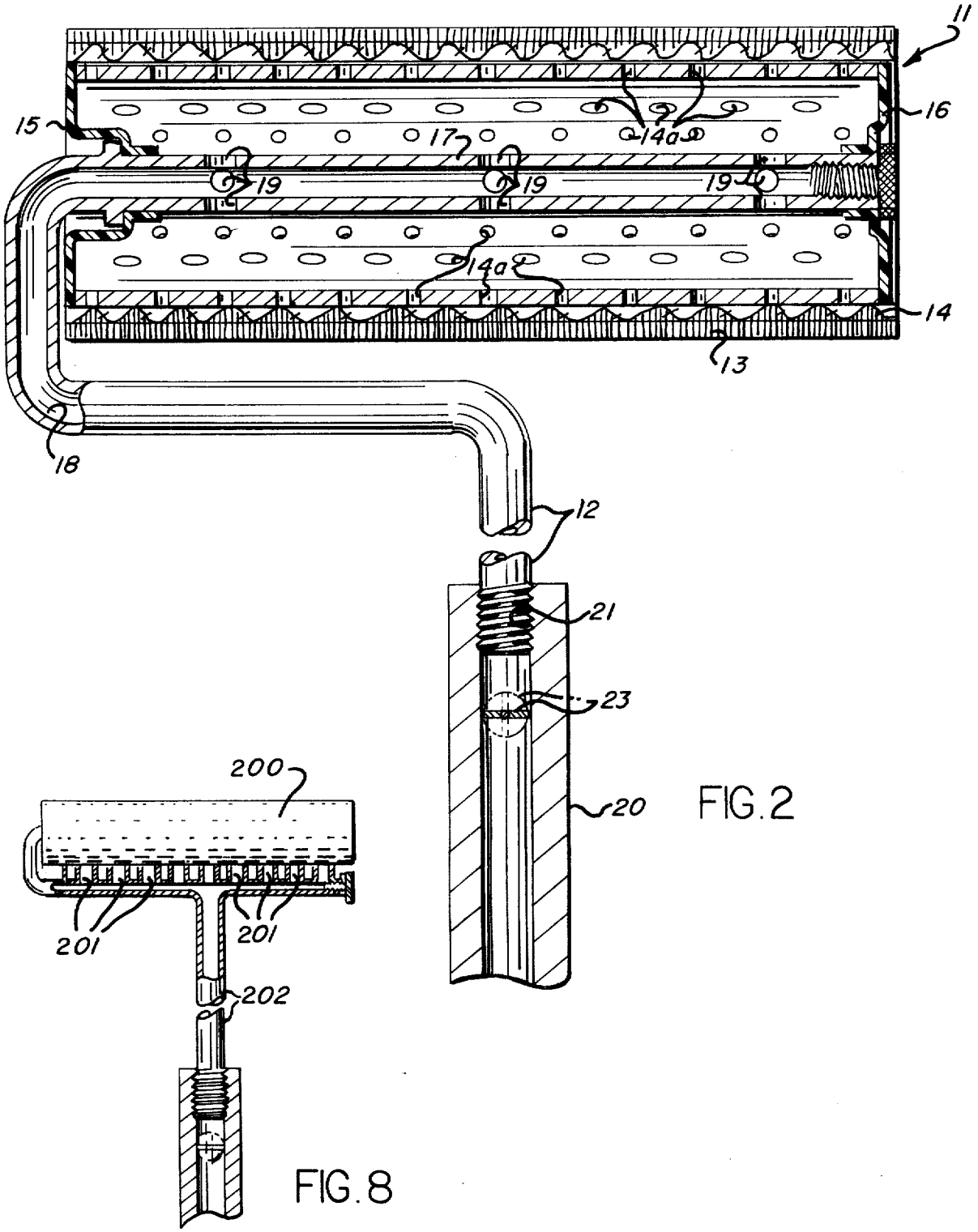
FIG. 2 is an enlarged sectional view taken approximately along the section line 2—2 of FIG. 1.
FIG. 8 is a view of an embodiment of the present invention in which paint is delivered externally of the applicator.
Figure 7:
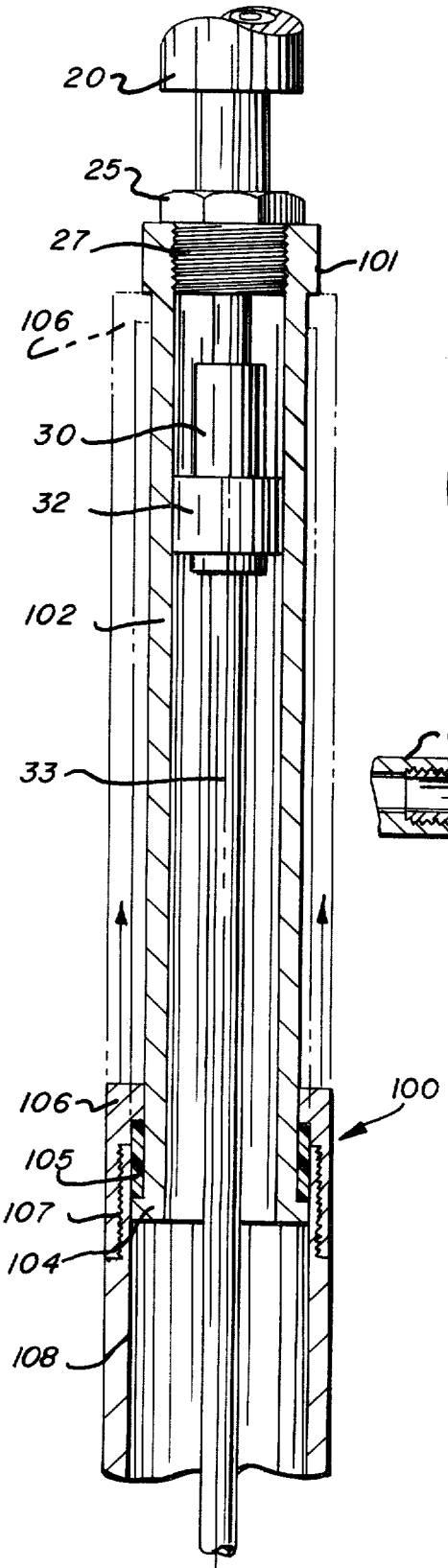
FIG. 7 is a sectional view of still another portion of the system.

The handle 12 may be of any conventional construction, but as shown in FIG. 2, the handle 12 is tubular and hollow and paint is flowed through a passageway 18 in the handle and into the axially extending portion 17 thereof. The paint which flows into the axially extending portion 17 flows out through a plurality of openings 19 therein into the interior of the roller 13. Of course, any paint which is delivered to the interior of the roller flows outwardly thereof for application to the surface which is being painted as the roller is moved along the surface by the operator who is painting the surface.

Connected to the handle 12 is a manually grippable handle portion 20 which has at one end 21 a threaded connection with the lower end of the handle 12. The member 20 is hollow so that any paint which is delivered thereto may flow therethrough. The handle 20 is also provided with a suitable valve which is manually adjustable. The valve is generally designated 23. The valve 23 may be adjusted in order to control the amount of paint which flows through the handle 20 into the roller 13. The valve may be adjustable by the operator by turning of a knob exteriorly of the handle as desired and may be locked in any particular position so as to control the flow of paint up to the roller 13. Of course, the valve 23 may be totally closed so that no paint is delivered to the roller 13. The position to which the valve is moved depends upon the desired amount of paint which is to be applied to the surface and the viscosity of the paint itself. The particular structure of the valve 23 forms no part of the present invention and will not be described in detail.

As illustrated in FIG. 3, the lower end of the handle 20 has an adaptor 25 associated therewith. The adaptor 25 has threads 26 which are threaded directly into the handle 20. The adaptor 25 also has external threads 27 at the lower end thereof, as viewed in FIG. 3. The adaptor 25 also has internal threads designated 28.

A suitable nipple 29 is threaded into the threads 28 and at its other end the nipple is suitably connected with a coupling or valve member 30. The valve member has external threads 31 thereon which are adapted to be received and threadedly engaged a coupling 32 carried on the end of a flexible [nose] *hose* 33. The coupling nut 32 also has associated with it a spherical seal member 34 which, when the coupling nut 32 is secured to the threads 31 of the coupling member 30, cooperates with a sealing conical surface 35 on a portion of the coupling member 30 and provides a fluid seal therebetween.

From the above, it should be apparent that when paint is directed through the flexible conduit 33, it is directed through the spherical member 34, the coupling member 30, the nipple 29, and adaptor 25 to the handle 20. If the valve member 23 is open, the paint will be directed therepast up to the roller 13 for application to the surface. The function of the external threads 27 will be described hereinbelow.

In order to effect the application of paint to the surface to be painted, paint is directed through the hose 33 to the roller 13. In this connection, as shown in FIG. 4, the hose 33 is suitably connected to the outlet 39 of a pump 40. The pump 40 may be of any conventional construction, but specifically and preferably is a screw-type pump or a gear-type pump which when operated generates sufficient suction in order to draw paint from the container with which the pump is associated. Specific details of the pump do not form a part of the present invention and will not be described in detail herein. The pump 40 is suitably supported on a plate member 41 and a motor 42 for operating the pump 40 is also mounted on the same plate member 41. The motor 42 may be any suitable electric motor and has an output shaft or a drive shaft 43 which rotates upon operation of the motor 42. The output shaft 43 is connected by a suitable belt drive 44 to an input shaft 45 of the pump 40. When the shaft 45 of the pump 40 is rotated by the motor 42, the pump 40 operates in order to draw paint from the container and directs that paint to the outlet 39 of the pump.

The pump 40 has a suitable inlet 50 which is in fluid communication with the paint in the container. The fluid inlet 50 may comprise any suitable laterally extending conduit and communicates with a vertically extending conduit 52, best seen in FIG. 5. The conduit 52 extends to the bottom of the container which contains the paint and which is generally designated 55. An upper projecting portion 56 of the conduit 52 is provided with a threaded cap at the end thereof and which is provided for priming the pump 40. Also, a suitable check valve 60 (schematically illustrated in FIG. 5) may be provided at the lower end of the conduit 52 in order to control the flow of paint through the conduit 52 only when the pump 40 is being operated.

The plate 41 on which the pump 40 and motor 42 are mounted is suitably connected to a pair of support arms 61 and 62 which are adapted to rest on the top of the container 55. Support arms 61 and 62 include turned-over opposite ends which engage wall surfaces of the container 55 in order to minimize any tendency of the support members and plate 41 to move on the upper surface relative to the container 55. Of course, on vertical lifting movement of the pump 40 and motor 42 and plate 41, the entire unit may be removed from the container 55 and on lowering movement may be placed on the container 55.

From the above, if it is desired to utilize the present system for painting a surface, all that it is necessary to do is to take the system, and particularly the unit with the plate 41 and support arms 61 and 62, and place those vertically downwardly on top of the container filled full of paint. Once the unit is placed on the container 55 of paint, the motor 42 may then be actuated to effect actuation of the pump 40. As the pump 40 operates, it will operate to draw fluid or paint through the conduit [55] *52* and into the inlet of the pump. The fluid will then be forced through the outlet 39 of the pump and into the hose 33 and through the hose up to the roller 13. It should be apparent, of course, that the pump 50 provides or effects no application of pressure on the container of paint and the container of paint is never pressurized as in many of the prior art systems, thus eliminating that problem.

In accordance with the present invention, interposed between the outlet 39 of the pump and the hose 33, is a suitable connection. The connection may be of a variety of constructions, but generally includes a fourway connector 71. The connector 71 has one inlet connected with and threaded into engagement with the outlet 39 of the pump 40. That connection is designated 72. The connector 71 has two outlets 73, 74, one of which or both of which may be connected with a hose such as 33. If only one of the connector outlets 73 or 74 is connected with a hose such as 33, then the other may be plugged, but as noted both outlets could be connected to a hose such as 33 for simultaneous delivery of paint to two separate applicators so that a single unit may deliver paint to two different applicators simultaneously.

The connector has a fourth outlet, generally designated 80. The outlet 80 communicates with a conduit 81 (See FIG. 6). The conduit 81 extends downwardly into the bottom of the can 55 of paint. The conduit 81 is continuously open so that as paint flows from the outlet 39 of the pump 40 to the hose 33, a percentage of the paint is continuously circulated through the conduit 81 and back into the can 55. The conduit 81 extends downwardly to the bottom of the can and the force of the paint which is forced through the conduit 81 is sufficient to cause a continuous mixing action of the paint 55 in the can. This mixing action occurs while paint is being drawn from the can by the pump 50 and being forced through the hose 33 to the applicator roller 13. As a result of this continuous mixing action, the problem of different coloration across the surface which is to be painted has been minimized. In addition, the conduit 81 which directs a percentage of the paint back into the can is a flexible conduit and may be removed from the can at any time. This provides the advantage that someone who may be working along with the operator or painter who is using the roller, such as someone who may be doing close work on the same wall, may obtain a supply of paint from the conduit 81. This further insures that the close work will be painted the same color as the main surface of the wall.

Figure 6:
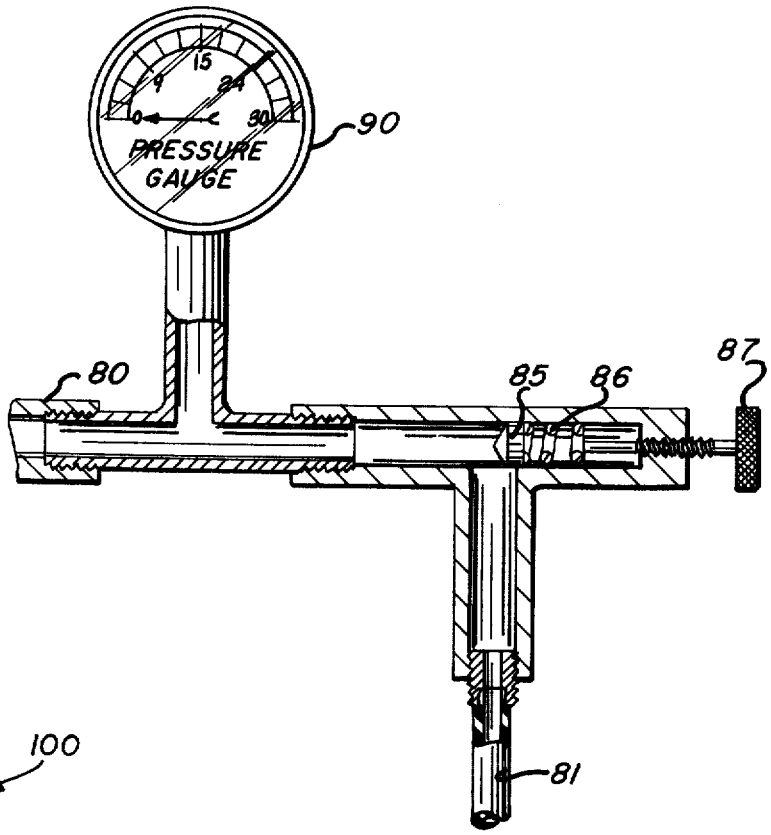
FIG. 6 is a sectional view taken approximately along line 6—6 of FIG. 4.

Preferably, interposed between the outlet 80 of the connector 71 and the conduit 81 is a suitable relief valve which is open when the pump is operating and which will open to a greater degree in the event of a pressure increase in the system as a safety feature. The particular type of safety valve which is utilized does not form a part of the present invention. Typically, the relief valve or reducing valve may include, as shown in FIG. 6 schematically, a valve member 85 which is biased in a flow-reducing direction by a spring member 86. A suitable adjusting handle 87 may be associated with the valve 85 and rotated in order to control the degree of biasing action which is supplied to the valve 85. By reducing the biasing force on the spring 86, of course, the valve 85 will open under a lower pressure. By increasing the bias on the spring 86, the valve 85 will move in an opening direction at a higher pressure. The valve 85 may be closed and opened as soon as the pump begins operating and thus, of course, continuously provides for and does not interfere with the circulation of paint back into the can 55, as described hereinabove. However, the valve will operate to move to a wider open position or more open position in the event of an abnormal or undesired increase in pressure in the system. In addition, associated with the conduit 81 may be a meter 90 which functions merely as a measure to indicate the pressure or output pressure in the system. Any conventional meter may be utilized and may be mounted in association with the system in any particular desired manner.

From the above, it should be apparent that applicant has provided a substantially improved system which utilizes the same pump 40 which effects the drawing of the paint from the container 55 and forcing that paint to the roller 13 to effect a mixing action of the paint in the container 55. This, of course, as noted above, provides for the uniform application and uniform color of the paint to the wall.

Not only does the present invention provide a substantial improvement in terms of the uniformity of color of the paint of the wall surface as well as minimizing pressure which is applied to the paint container, but also the present invention provides a simplification and flexibility in the use of the applicator 13 close quarters, as well as for reaching to surfaces which normally or otherwise would require the use of some such device as a ladder. This feature of the present invention comprises a telescoping handle generally designated 100 (See FIG. [6] *7*). The telescoping handle 100 is threadedly connected to the adapter 25 and particularly to the threads 27 thereof. The telescoping handle includes a threaded connector portion 101 which is threaded onto the threads 27 of the adapter 25. The threaded portion 101 comprises the outer end of a tubular portion 102 of the telescoping handle 100. The end of the telescoping portion 102 of the handle 100 opposite the end having the threads 101 is provided with a stop 104. The stop 104 has associated with it a plastic bushing 105. A nut 106 is slidably mounted on the telescoping member 102 but can not be removed from the telescoping tubular member 102 due to the location of the stop 104. The nut 106 has internal threads which cooperate with external threads 107 on a telescoping tubular portion 108. The telescoping tubular portion 108 has an internal diameter which is slightly larger than the external diameter of the tubular portion 102. Upon releasing of the nut 106, the nut 106 as well as the tubular portion 108 may be slid along the portion 102 into a telescoping relationship. When the nut 106 is tightened, it cooperates with the bushing 105 and tubes 102 and 108 to tightly clamp them together, as is well known. Any conventional structure may be provided for the telescoping of the telescoping parts, but it should be apparent that the telescoping parts may [he] *be* telescoped with respect to each other to change the reach of the system. The important point to be recognized is that the structure provides for the hose 33 to extend through the telescoping handle 100. As a result, no paint comes into contact with any slidable connection of the telescoping handle 100. Thus, the possibility of any leakage of paint through a telescoping connection or slidable connection of the handle is completely eliminated. Moreover, it should be apparent that since the telescoping handle 100 can be removed or released from the handle 20 by merely releasing threads 101 from the threads 27, the telescoping handle 100 can be slid along the flexible conduit 33 to an out-of-the-way position, so that for close work the operator may manually engage the handle 20 to operate the roller 13. However, if it is necessary to provide for a greater reach, all that is necessary is to slide the telescoping handle 100 into position and threadedly connect it to the threads 27 and this can be accomplished without any disconnection of the paint connector or flexible hose 33, either with the pump 40 or with the roller 13.

FIG. 8 illustrates the modification of the present invention in which paint is delivered externally of the roll rather than to the interior of the roll. The structure disclosed in FIG. 8 is believed to be clear. It includes a roller 200 to which paint is delivered exteriorly through opening 201 in the handle 202 through which the paint is conveyed to the roller from a suitable supply in the manner described above in connection with the embodiment of FIG. 1.

In view of the above, it should be apparent that applicant has provided a substantially improved construction and paint system as well as a method of applying paint to a surface to be painted by paint from an open container.

What is claimed is:

1. An apparatus for use in applying paint in a container to a surface comprising paint applicator means movable along the surface to apply paint directed thereto to the surface, conduit means for directing paint from said container to said applicator means, a pump having an inlet in communication with the paint in the container and operable to continuously draw paint from the container, said pump having an outlet communicating with said conduit means and into which said pump directs the paint and through which the paint is forced by said pump to said applicator means, means for continuously directing at least a part of said paint from the outlet of said pump back to the container to continuously mix the paint in the container while paint is being delivered to said applicator means for application to the surface, said conduit means comprising a hollow handle for supporting said paint applicator and through which paint is directed to said paint applicator, and a flexible conduit connected to the pump outlet and directly connected to said hollow handle, said apparatus further including a telescoping handle having a separate connection with said hollow handle enabling said telescoping handle to be removed from said hollow handle without disconnection of said flexible conduit therefrom, and said telescoping handle being hollow and said flexible conduit extending therethrough.

2. An apparatus as defined in claim 1 wherein said hollow handle has a valve therein adjustable to control paint flow to said applicator, and said telescoping handle comprises relatively slidable tubes.

*3. An apparatus for use in applying a fluid to a surface comprising:*

*applicator means movable along the surface to apply the fluid directed thereto to the surface;*

*conduit means for directing the fluid to said applicator means,*

*said conduit means comprising a hollow handle for supporting said applicator and through which the fluid is directed to said applicator, and a flexible hose fixedly connected to said hollow handle, means fixedly connecting said flexible hose to said hollow handle to communicate fluid from said flexible hose into said hollow handle; and*

*a telescoping handle connected to said hollow handle, means removably connecting said telescoping handle to said hollow handle to enable removal thereof from said hollow handle without disconnecting said flexible conduit therefrom, said telescoping handle including a pair of telescoping hollow tubular parts and said flexible hose extending through said telescoping tubular parts.*

*4. An apparatus as defined in claim 3 wherein said means fixedly connecting said flexible hose to said hollow handle comprises a coupling portion having a fluid passage therethrough and an adaptor portion to which said telescoping handle is removably connected and having a passage communicating with said passage in said coupling portion and in said adaptor portion.*

* * * * *